Patented Apr. 30, 1946

2,399,479

UNITED STATES PATENT OFFICE 2,399,479

NITROGENOUS ESTER

William S. Emerson, Dayton, Ohio, assignor to Monsanto Chemical Company, St. Louis, Mo., a corporation of Delaware No Drawing. Application September 18, 1944, Serial No. 554,725

1 Claim. (Cl. 260—490)

The present invention relates to a new nitrogenous ester, more particularly to the triacetate of alpha-(N-bis(beta-hydroxyethyl)aminomethyl)benzyl alcohol, and to a process of producing the same.

An object of the present invention is to provide a new composition of matter useful in the plastics and coatings industries as a plasticizer. Another object of the invention is to provide new, efficient, heat- and light-stabilizers for chlorine-containing plastics and resins.

These objects are accomplished by the following invention wherein there is disclosed the new nitrogenous ester having the structure:

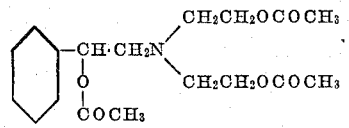

which is alpha-(N-bis(beta-acetoxyethyl)aminomethyl)benzyl acetate.

EXAMPLE

*Alpha-(N-bis(beta-acetoxyethyl)aminoethyl)-benzyl acetate*

A mixture consisting of 47 grams of alpha-(N-bis(beta-hydroxyethyl)aminoethyl)benzyl alcohol (obtained by reaction of styrene chlorohydrin with diethanolamine), 240 cc. of acetic anhydride and 24 grams of sodium acetate was refluxed for 2.5 hours. At the end of this time the reaction mixture was poured into cold water in order to decompose the anhydride, and the resulting mass was then extracted 3 times with benzene. Upon distillation of the benzene extract under partial vacuum, there was obtained 55 grams (75%) of a fraction, B. P. 195–223° C. at 2 mm., from which upon redistillation was obtained the substantially pure alpha-(N-bis(beta-acetoxyethyl)aminomethyl)benzyl acetate, B. P. 196–197° C./2 mm., $n_D^{25}$ 1.4925, $D_{25}^{25}$ 1.129, $M_D$ calcd. 90.8, $M_D$ found 90.5, and analyzing as follows:

|  | Per cent C | Per cent H |
|---|---|---|
| Found | 60.7 | 7.12 |
| Calcd. for $C_{15}H_{25}O_6N$ | 61.5 | 7.12 |

Esterification may also be carried out by the use of acetic acid in the presence of a small amount of a strong acid (sulfuric, phosphoric, hydrochloric or trichloracetic) in such a manner as to remove the water as formed.

The alpha-(N-bis(beta-hydroxyethyl)aminomethyl)benzyl alcohol used to prepare the new ester may be prepared by adding to a boiling mixture of 35 grams of diethanolamine, 42 grams of sodium bicarbonate and 50 cc. of water, approximately 52 grams of styrene chlorhydrin over a period of about thirty-five minutes. After refluxing six hours or more, the mixture was cooled, the layers separated and the aqueous portion extracted with benzene. When the combined non-aqueous fractions were distilled, the alpha-(N-bis(beta-hydroxyethyl)aminoethyl)benzyl alcohol was collected as a distillate at 203–260° C./6 mm.; yield approximately 60%.

The ester described above is an excellent plasticizer and heat- and light-stabilizer for Vinylite resins. It also exhibits very good plasticizing and light stabilizing properties when incorporated in other synthetic resins and plastics, for example, chlorinated rubber, polyvinyl acetate, polyvinyl butyral, polystyrene and chlorinated polystyrene.

This application is a continuation-in-part of my copending application Serial No. 500,238, filed August 27, 1943.

I claim:

Alpha-(N-bis(beta-acetoxyethyl)aminomethyl)benzyl acetate.

WILLIAM S. EMERSON.